United States Patent [19]
Osbourne

[11] Patent Number: 5,373,286
[45] Date of Patent: Dec. 13, 1994

[54] APPARATUS AND METHOD FOR ESTABLISHING A PREDETERMINED GAP BETWEEN TWO SURFACES

[75] Inventor: William G. Osbourne, Webster, N.Y.

[73] Assignee: Xerox Corporation, Stamford, Conn.

[21] Appl. No.: 120,983

[22] Filed: Sep. 13, 1993

[51] Int. Cl.$^5$ ............................ G01B 7/02; G01B 7/04
[52] U.S. Cl. .................................... 340/687; 340/686; 33/561; 33/560; 324/716
[58] Field of Search ................. 33/559, 560, 561, 504, 33/533; 324/699, 716; 340/687, 686

[56] References Cited

U.S. PATENT DOCUMENTS

| | | |
|---|---|---|
| 4,345,380 | 8/1982 | Vis . |
| 4,380,873 | 4/1983 | Ayres ..................................... 33/504 |
| 4,751,457 | 6/1988 | Veenendaal ........................... 33/533 |
| 4,785,548 | 11/1988 | Saleh . |
| 4,967,485 | 11/1990 | Brown et al. . |
| 5,119,568 | 6/1992 | Vesco .................................... 33/561 |

Primary Examiner—Kenneth A. Wieder
Assistant Examiner—Jose M. Solis
Attorney, Agent, or Firm—Denis A. Robitaille

[57] ABSTRACT

An apparatus and method for accurately establishing a predetermined gap between two surfaces, and in particular, between a corona generating device and a photoreceptive member in an electrostatographic printing machine, comprising a first conductive member for being mounted on a first of the two surfaces, a second conductive member for being placed on a second of the two surfaces, the combined thickness of the first and second conductive members being substantially equal to the predetermined gap. A device is coupled between the first and second conductive members, for sensing electrical continuity therebetween.

3 Claims, 3 Drawing Sheets

APPARATUS AND METHOD FOR ESTABLISHING A PREDETERMINED GAP BETWEEN TWO SURFACES

The present invention relates generally to an apparatus and method for establishing a gap having a predetermined dimension between two surfaces, and more particularly concerns an apparatus and method for establishing a predetermined gap between an adjustably mounted corona generating device and a photoreceptive member in an electrostatographic printing apparatus.

As is well known in the art, the process of electrostatographic copying is executed by exposing a light image of an original document to a substantially uniformly charged photoreceptive member. Exposing the charged photoreceptive member to a light image discharges a photoconductive surface on the photoreceptive member in areas corresponding to non-image areas in the original document, while maintaining the charge in image areas to create an electrostatic latent image of the original document. Thereafter, the latent image is developed into a visible image by depositing charged developing material onto the photoreceptive member such that the development particles electrostatically adhere to the photoconductive surface in the charged image areas thereon. This developed image is subsequently transferred to another support surface, as for example, a copy sheet, and fixed thereto, to generate a permanent copy of the original document.

Electrostatographic processes and machines for carrying out the many processes described above are well known and will not be described in detail herein. Numerous printed publications and patents are available in which these details are set forth, as for example: "Electrophotography" by R. M. Schaffert, and "Xerography and Related Processes" by John H. Dessauer and Harold E. Clark, both first published in 1965. These references, and the various patents and other references cited therein, are incorporated by reference herein.

The initial step in the electrostatographic copying process involves generating an electrostatic charge on the surface of the photoreceptive member. In this regard, it is critical that the electrostatic charge imparted to the photoreceptive member be uniform across the photoconductive surface thereof. Irregularities in charge uniformity across the photoconductive surface tend to deteriorate the quality of the final output copy.

The electrostatic charge imparted to the photoreceptive member is typically produced by a corona generating device, wherein uniformity of the electrostatic charge created thereby is generally affected by maintaining tile corona generating device at a precise predetermined distance from the photoconductive surface of the photoreceptive member. More importantly, establishing a precise gap between the corona generating device and the photoconductive surface directly affects the charge voltage across the corona generating device as well as the electrical life of both the corona generating device and the photoreceptive member. Thus, it is highly desirable to provide an effective mechanical system for adjusting the spatial distance between the corona generating device and the photoreceptive member in an electrostatographic machine. Adjustable mounting apparatus of this type are known in the art, wherein exemplary devices are disclosed in U.S. Pat. Nos. 3,800,830, 3,919,605, 3,922,548, 4,252,431 and 4,260,240, as well as commonly assigned copending U.S. patent application, identified by Attorney Docket No. D/93401.

Notwithstanding the advantages provided by the above-identified prior art, establishing a precise gap between a corona generating device and a photoconductive surface has typically been accomplished by relatively crude measurement techniques, including visual inspection and various approaches which are largely dependent on the skill and determination of technical service representatives and are subject to wide variability and error. The present invention provides an apparatus and method for establishing a precise predetermined gap between a corona by different uncontrollable factors. The following disclosures may be relevant to various aspects of the present invention:

U.S. Pat. No. 4,345,380 Patentee: Vis Issued: Aug. 24, 1982

U.S. Pat. No. 4,785,548 Patentee: Saleh Issued: Nov. 22, 1988

U.S. Pat. No. 4,967,485 Patentee: Brown et al. Issued: Nov. 6, 1990

The relevant portions of the foregoing disclosures may be briefly summarized as follows:

U.S. Pat. No. 4,345,380 discloses a hand held, manually operable gauge for measuring the gap between opposing surfaces of a pair of spaced parts, including a pair of reciprocable gauge fingers insertable into the gap and respectively shiftable into engagement with the spaced parts. One of the fingers is stationarily mounted on a handle while the other finger is secured to a plunger which is slidably mounted on the handle and driven by a lever, wherein linear displacement of the plunger is translated to rotary motion for operating a potentiometer, the setting of which corresponds to the magnitude of the gap.

U.S. Pat. No. 4,785,548 discloses an apparatus and method for accurately setting a cutting gap of a fiber cutting assembly of the type having a plurality of spaced part cutting blades and a presser roll mounted adjacent thereto and positioned at a predetermined distance from the cutting edges of the cutting blades to define a cutting gap. The apparatus comprises a gauge member at one of the cutting blade positions which extends radially beyond the radial distance of the blades and corresponds to the desired cutting gap setting. That patent means for electrically sensing contact of the gauge member with the presser roll.

U.S. Pat. No. 4,967,485 discloses an electronic feeler gauge for measuring the dimension of a gap wherein a flexible base having a raised shoulder portion of greater thickness and a forwardly extending tab is coupled to a strain gauge mounted substantially in line with the tab at the lower portion of the concave curve so as to measure strain across the width thereof. Electrical signals from the strain gauge are conducted to a strain meter by electrical wires for analyzing the signals and converting them to reading indicating the size of the gap into which the flexible base is inserted.

In accordance with the present invention, an apparatus for accurately establishing a predetermined gap between two surfaces is provided, including a first conductive member having a first predetermined thickness, for being placed on a first of the two surfaces, and a second conductive member having a second predetermined thickness for being placed on a second of the two surfaces, wherein the combined thickness of the first and second conductive members is substantially equal to the predetermined gap. Electrical sensing means, coupled between the first and second conductive members for sensing electrical continuity therebetween, are also provided.

In accordance with a particular aspect of the invention, an apparatus for establishing a predetermined gap between a corona generating device and a photoconductive surface in an electrostatographic printing apparatus is provided, comprising: a conductive member having a first predetermined thickness for being attached to the corona generating device; a substrate member including a conductive segment having a second predetermined thickness for being placed between the conductive member mounted on the corona generating device and the photoconductive surface, wherein the substrate member and the conductive segment have a combined predetermined thickness; and means, coupled between the conductive member and the conductive segment, for sensing electrical continuity therebetween.

In accordance with yet another aspect of the invention, an apparatus for establishing a uniform predetermined gap between a corona generating device having an elongated body and a photoconductive surface in an electrostatographic printing apparatus is provided. The apparatus includes: first and second conductive clip members for being attached to the corona generating device at opposite ends of the elongated body thereof; a substrate member including first and second conductive segments for respective alignment with the first and second conductive clip members, the substrate member being positioned between the photoconductive surface and the corona generating device such that the substrate member, a conductive segment, and a conductive clip member combine to provide the predetermined gap; and means, coupled between the first and second conductive clip members and the first and second conductive segments, respectively, for sensing electrical continuity therebetween.

In accordance with yet another aspect of the invention, a method for accurately establishing a predetermined gap between a photoconductive surface and a corona generating device in an electrostatographic printing apparatus is disclosed, comprising the steps of: mounting a conductive clip to the corona generating device such that the conductive clip has an exposed surface adjacent the photoconductive surface; placing a substrate having a conductive pad on the photoconductive surface such that the conductive pad faces the exposed surface of said conductive clip at a position where the predetermined gap is to be established; coupling the conductive clip and the conductive pad to an electrical resistance measuring device, for measuring the electrical resistance therebetween; and adjusting the position of the corona generating device relative to the photoconductive surface to place the conductive clip into contact with the conductive pad such that an indication of substantially zero resistance therebetween corresponds to the predetermined gap.

These and other aspects of the present invention will become apparent from the following description in conjunction with the accompanying drawings in which.

Figure 2:
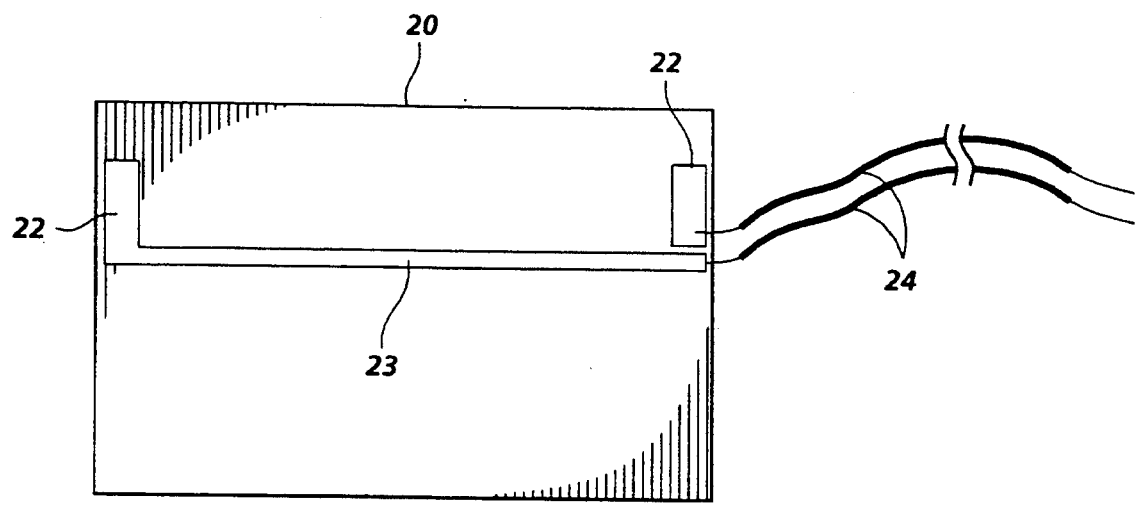
FIG. 2 is a plan view of a flexible substrate having conductive segments operative to set the corona generating device apart from the photoreceptive member in the practice of the present invention.
Figure 3:
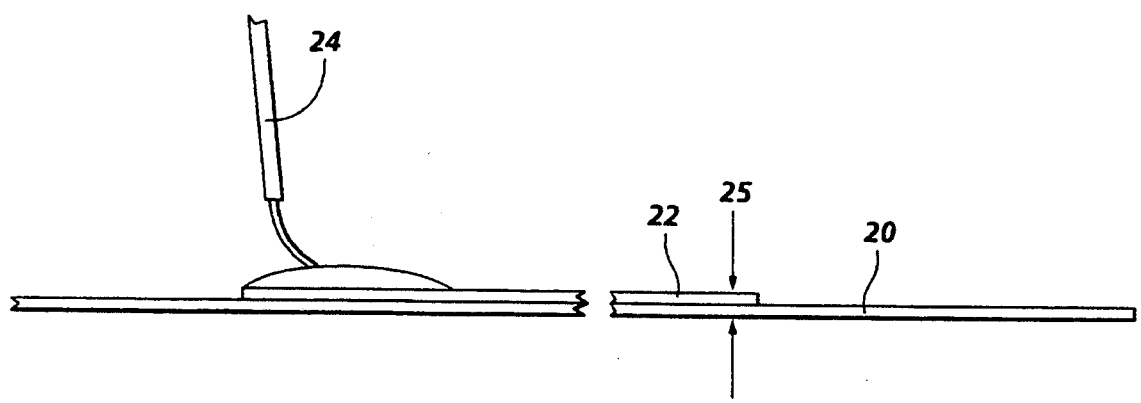
Figure 4:
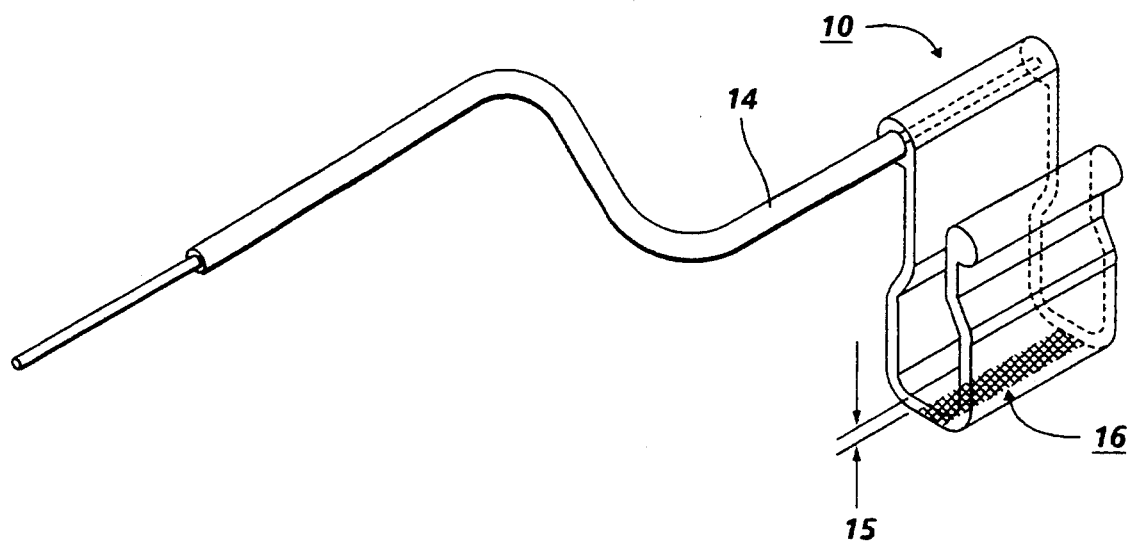

FIG. 3 is an enlarged side view of the flexible substrate of FIG. 2, showing the combined thickness of the flexible substrate and the conductive segment laminated thereto for setting the corona generating device apart from the photoreceptive member in the practice of the present invention; and FIG. 4 is a perspective view of a conductive clip member for mounting on the side shield of a corona generating device in the practice of the present invention.

For a general understanding of the features of the present invention, reference is made to the drawings, wherein like reference numerals have been used throughout to designate corresponding elements of a preferred embodiment. While the present invention will be described in terms of a specific preferred embodiment, it will be understood that the invention is not to be limited to this preferred embodiment. For example, although the present description is directed toward an apparatus and method for use in conjunction with an electrostatographic machine, the use should not be limited to the environment of an electrostatographic machine. On the contrary, the present invention is intended to cover all alternatives, modifications, and equivalents as may be included within the spirit and scope of the invention as defined by the appended claims.

Figure 1:
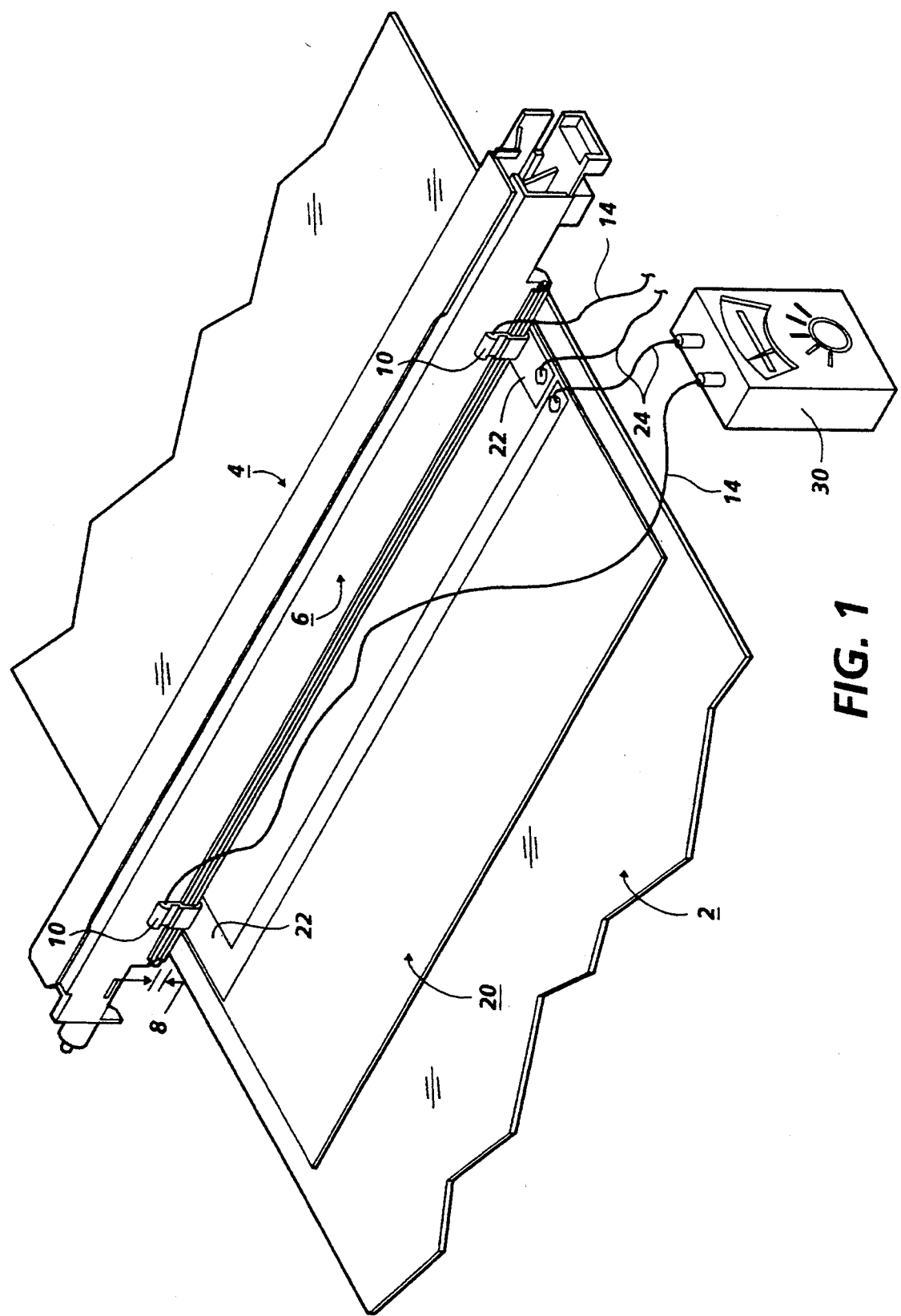
FIG. 1 is a perspective view of the gap establishing apparatus of the present invention shown in configuration with an exemplary photoconductive belt member and a corona generating device as would be found in a representative electrostatographic machine.

Referring initially to FIG. 1, a perspective depiction of the apparatus and method for establishing a predetermined gap between a corona generating device and a photoreceptive member in an electrostatographic machine is provided. As seen in FIG. 1, a corona generating device, generally indicated by reference numeral 4, having side shield elements 6 on either side thereof, is juxtaposed transverse to a supported photoreceptive belt member, generally indicated by reference numeral 2. The corona generating device 4 is positioned adjacent to, but spaced from, the surface of the photoreceptive member 2 such that a minute but significant gap exists between the side shield members 6 of the corona generating device 4 and the photoconductive surface of the photoreceptive member 2, as identified by reference numeral 8. The actual dimension of gap 8 is determined by engineering specifications for the particular electrostatographic machine, predicated on providing sufficient charge voltage to the photoconductive surface of the photoreceptive member while minimizing the voltage applied to the corona generating electrode (not shown) of the corona generating device 4. A typical gap dimension could range between 1.5 and 3 mm. It will be recognized that even if a relatively large error tolerance of, say 25%, is permitted, this translates to an extremely small (approximately 0.4 mm) linear tolerance when mounting the corona generating device 4 relative to the photoconductive member 2.

As previously stated, the present invention provides an apparatus for establishing a predetermined gap between the corona generating device 4 and the photoconductive member 2. The apparatus of the present invention is also shown in FIG. 1, comprising a pair of conductive clips 10 and a substrate member 20. Each of the components of the gap establishing apparatus will be described in detail hereinbelow.

Substrate member 20 comprises a sheet of flexible material, preferably a polyester or other plastic material or any other resilient material, having a pair of conductive pads 22 secured to a surface thereof. The conductive pads 22 may be secured to the flexible sheet 10 via an adhesive or other various lamination techniques The conductive pads 22 are positioned adjacent opposite ends or edges of the substrate member 20 along a substantially common axis for being positioned in alignment with the corona generating device 4, as will be further described hereinbelow. The material making up the substrate member 20 and each conductive pad 22 has a combined predetermined thickness, identified by reference numeral 25 in FIG. 3, which is operative to set the corona generating device 4 apart from the photoreceptive member 2 in the practice of the present invention. Each of the conductive pads 22 is also provided with a conductive electrode 24 electrically coupled thereto for facilitating electrical connection between the conductive pads 22 and a sensing device 30, as will also be further described hereinbelow.

FIG. 4 shows an enlarged perspective view of one conductive clip member 10 for being attached to a side shield segment 6 of the corona generating device 4. The conductive clip member 10 includes a generally channel shaped body made of some resilient material which can be positioned on a side shield segment 6 for being temporarily secured thereto. The conductive clip 6 is preferably provided with a base section having an exposed surface 16. The base section has a substantially uniform predetermined thickness, as indicated by reference numeral 15, which is utilized to establish the predetermined gap in cooperation with the combined thickness of the material making up the substrate member 20 and each conductive pad 22 for placing the corona generating device 4 apart from the photoreceptive member 2 in the practice of the present invention. In a preferred embodiment, the conductive clip is fabricated from a carbon loaded thermal plastic to facilitate molding of the clip. Each conductive clip member 6 is also provided with a conductive electrode or lead member 14 to facilitate electrical connection to a sensing device 30, as will be described.

Now that each of the components of the present invention have been described in detail, a description of the complete gap establishing apparatus will be provided. It will be understood that the goal of the apparatus provided by the present invention is to establish a predetermined gap between the corona generating device 4 and the photoconductive surface of the photoreceptive member 2. In order to practice the present invention, conductive clip members 10 are initially attached to, or mounted on, the side shield member 6 of the corona generating device, at either end thereof, so as to place an exposed surface 16 of each clip 10 in a position facing the photoreceptive member 2. Thereafter, substrate member 20 is positioned on the photoconductive surface between the corona generating device and the photoreceptive member such that the conductive pads 22 thereon, each lay in alignment with a respective conductive clip 10. The gap a is accurately established by determining that electrical continuity exists between a conductive pad 22 and a conductive clip 10, wherein the predetermined gap is equal to the combined thickness of the material making up the substrate member 20, a conductive pad 22, and the thickness of the base segment of a conductive clip 10.

Electrical continuity between a conductive pad 22 and a conductive clip 10 is determined by means of an electrical resistance sensing device 30 such as a common ohmmeter wherein the ohmmeter is coupled between an opposing conductive pad 22 and conductive clip 16, as shown in FIG. 1. An indication of substantially zero resistance by the ohmmeter denotes electrical continuity between the clip 10 and the conductive pad 22, thereby indicating that the conductive clip 10 and the conductive pad 22 are in contact with one another such that the distance separating the corona generating device shield 6 and the photoconductive surface of the photoreceptive member 20 is precisely equal to the combined thickness of the material making up the substrate member 20, a conductive pad 22, and the thickness of the base segment of a conductive clip 10.

It will be seen from FIG. 1, that the preferred embodiment for the present invention provides first and second conductive clips 10 for mounting on the elongated body of a corona generating device 4 and that the substrate member 20 includes a first and second conductive pads 22 located along opposite ends of the substrate 20 for being positioned in alignment with the first and second conductive clip members 10, respectively. Using this preferred embodiment, the predetermined gap can be established at opposite ends of the elongated body of a corona generating device to assure a uniform gap dimension across the entire length of the corona generating device. The preferred embodiment, therefore, provides for uniform electrostatic charge being applied to the photoconductive surface.

It is important to note, that once the predetermined gap dimension has been established, the substrate member 20 and the conductive clips 10 are to be removed from the electrostatographic machine to allow for normal operation thereof. The substrate member 20 of the preferred embodiment also provides for protection of the photoconductive surface in the event that the corona generating device is mishandled or inappropriately positioned such that it might contact the sensitive photoconductive surface of the photoreceptive member 2.

In addition to the preferred embodiment described hereinabove, it will be understood that various predetermined gaps can be established in different environments, as necessary, by simply inserting substrates having predetermined thicknesses underneath substrate 20 or by providing clips having various predetermined thicknesses in the form of a tool kit, for example, to provide a combined aggregate thickness, as desired.

In recapitulation, it should be clear from the foregoing discussion that the apparatus of the present invention provides a novel apparatus and method for accurately establishing a predetermined gap between two surfaces such as a corona generating device and a photoconductive surface. The gap establishing apparatus comprises a substrate member having a conductive pad thereon and a conductive clip for mounting opposite the conductive pad wherein the combined thickness of the substrate member, the conductive pad, and the conductive clip is equivalent to a predetermined desired gap dimension. The conductive pad and conductive clip are each coupled to an electrical resistance measuring device such that an indication of electrical continuity therebetween corresponds to the establishment of the predetermined gap.

It is, therefore, apparent that there has been provided, in accordance with the present invention, a corona generating assembly that fully satisfies the aims and advantages set forth hereinabove. While the present invention has been described in conjunction with a specific embodiment thereof, it will be evident to those skilled in the art that many alternatives, modifications and variations are possible to achieve the desired results. Accordingly the present invention is intended to embrace all such alternatives, modifications, and variations which may fall within the spirit and scope of the following claims.

I claim:

1. An apparatus for establishing a substantially uniform predetermined gap between a corona generating device having an elongated body and a photoconductive surface in an electrostatographic printing apparatus, comprising:

a first conductive clip member for being attached to the corona generating device at one end of the elongated body thereof;

a second conductive clip member for being attached to the corona generating device at another end of the elongated body thereof;

a substrate member including
 a first conductive segment for alignment with said first conductive clip member with said substrate member being positioned between said photoconductive surface and said corona generating device such that said substrate member, said first conductive segment, and said first conductive clip member combine to provide the predetermined gap at one end of the elongated body of the corona generating device; and
 a second conductive segment for alignment with said second conductive clip member with said substrate member being positioned between said photoconductive surface and said corona generating device such that said substrate member, said second conductive segment, and said second conductive clip member combine to provide the predetermined gap at another end of the elongated body of the corona generating device; and means, coupled between said first conductive member and said first conductive segment for sensing electrical continuity therebetween, and further coupled between said second conductive member and said second conductive segment, for sensing electrical continuity therebetween.

2. The apparatus of claim 1, wherein:

said substrate member includes a sheet of substantially flexible material; and said first and second conductive segments include a thin metal strip being laminated to said flexible sheet.

3. The apparatus of claim 2, wherein:

said first and second conductive clip members each include a conductive electrode connected respectively thereto for facilitating electrical connection to said sensing means; and said first and second conductive segments each include a conductive electrode connected respectively thereto for facilitating electrical connection to said sensing means.

* * * * *